United States Patent

[11] 3,584,892

[72] Inventor Ronald D. Moore
    Saginaw, Mich.
[21] Appl. No. 845,465
[22] Filed July 28, 1969
[45] Patented June 15, 1971
[73] Assignee Saginaw Products Corporation
    Saginaw, Mich.

[54] ARTICULATED VEHICLE SUSPENSION SYSTEM
    16 Claims, 8 Drawing Figs.
[52] U.S. Cl. .................................................. 280/104
[51] Int. Cl. .................................................. B62d 21
[50] Field of Search .................................................. 280/104,
    129, 106, 106.5

[56] References Cited
    UNITED STATES PATENTS
    3,266,815  8/1966  Bishop .................... 280/104
    3,366,398  1/1968  Mulholland ............. 280/104

Primary Examiner—Milton Buchler
Assistant Examiner—Steven W. Weinrieb
Attorney—Learman, Learman and McCulloch ABSTRACT: An articulated suspension system for a vehicle wherein an articulated rectangular frame mounted on wheels or other ground support members includes two articulately connected angle portions which are adapted to be pivotally connected to a load bearing frame about spaced-apart generally parallel axes, preferably by fixed and movable pivot mounts. The two portions pivot relative to each other about an axis which extends diagonally of the articulated rectangular frame and is parallel to the spaced apart axes mentioned.

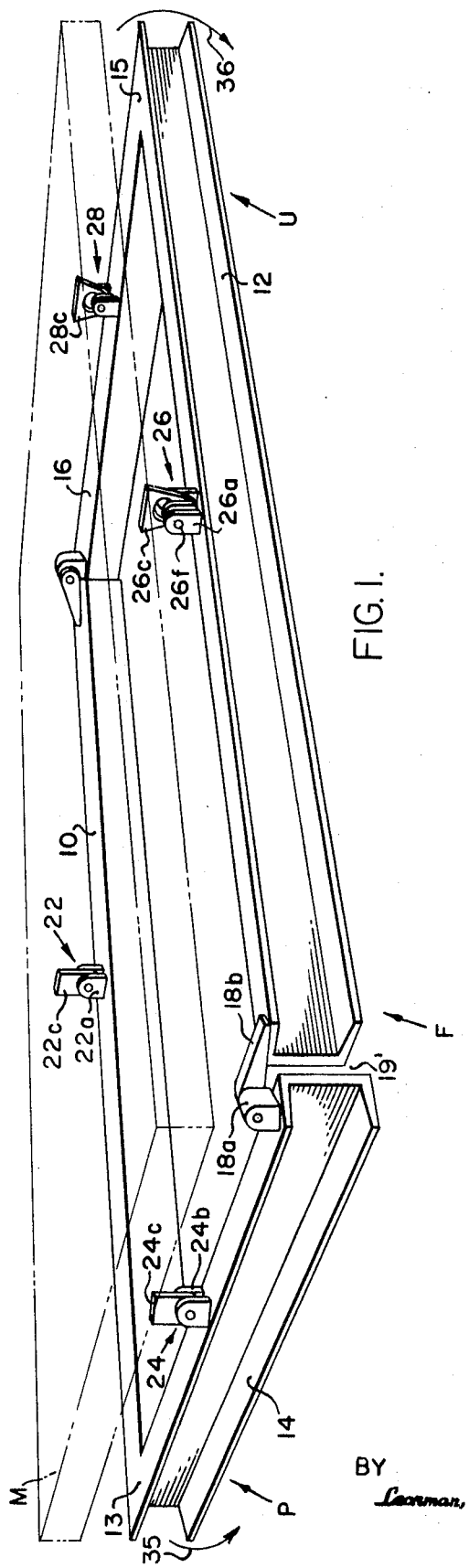
PATENTED JUN 15 1971
3,584,892
SHEET 1 OF 4
FIG.I.
INVENTOR
RONALD D. MOORE
BY
Learman, Learman & McCulloch

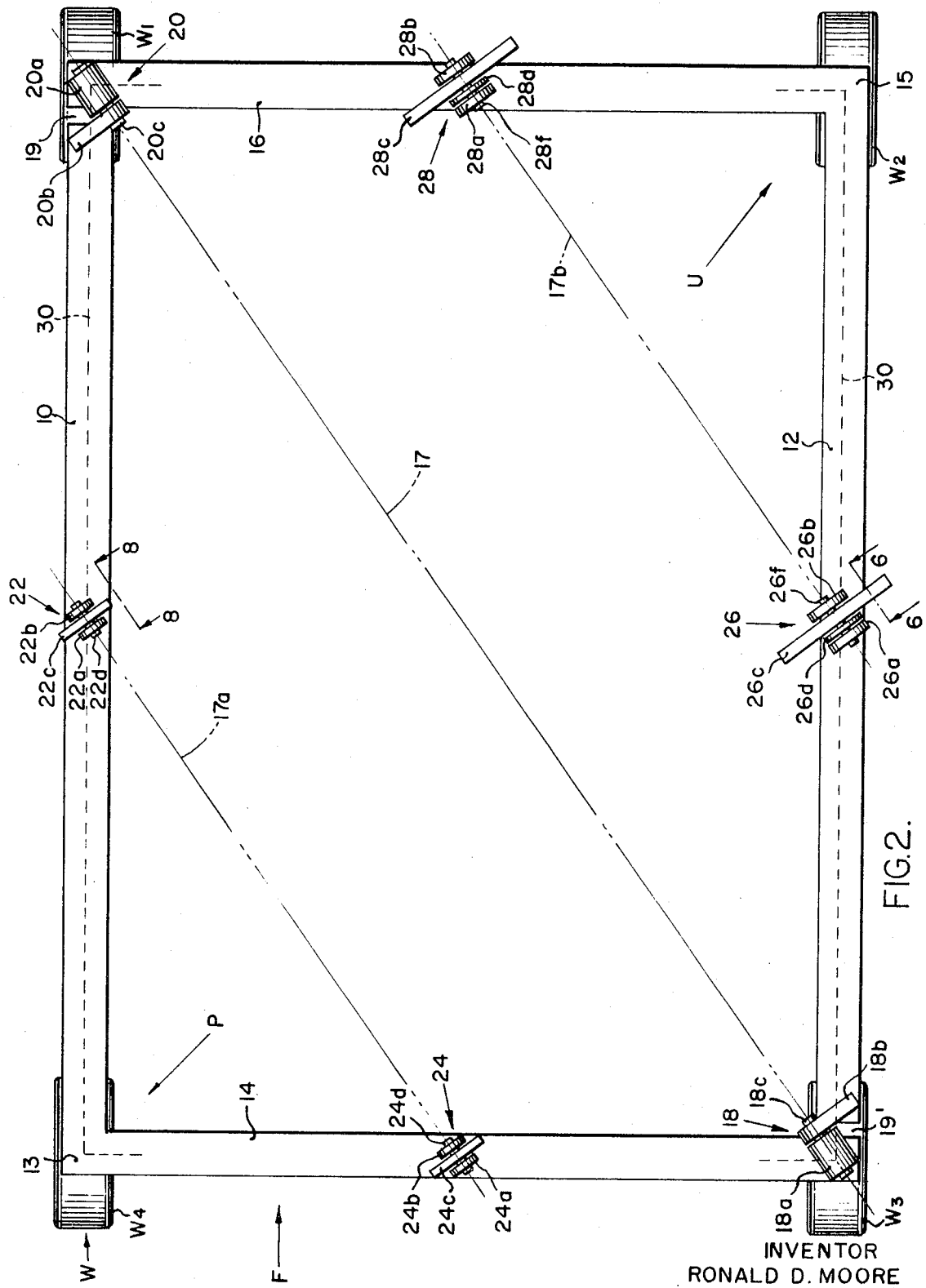

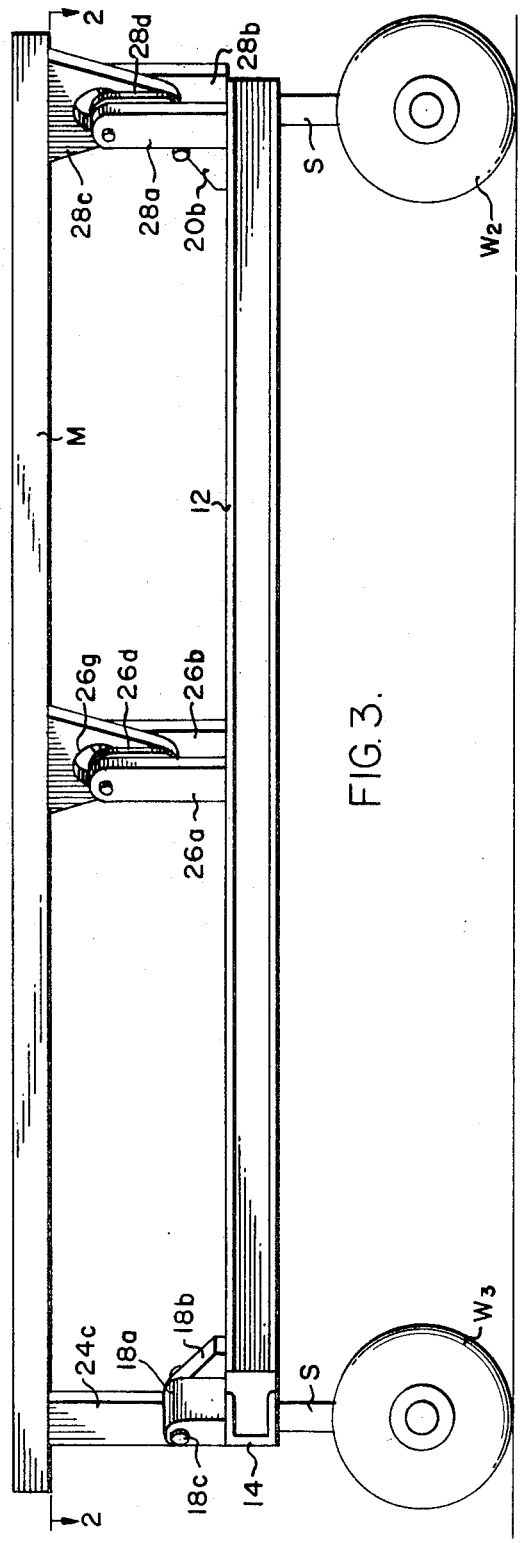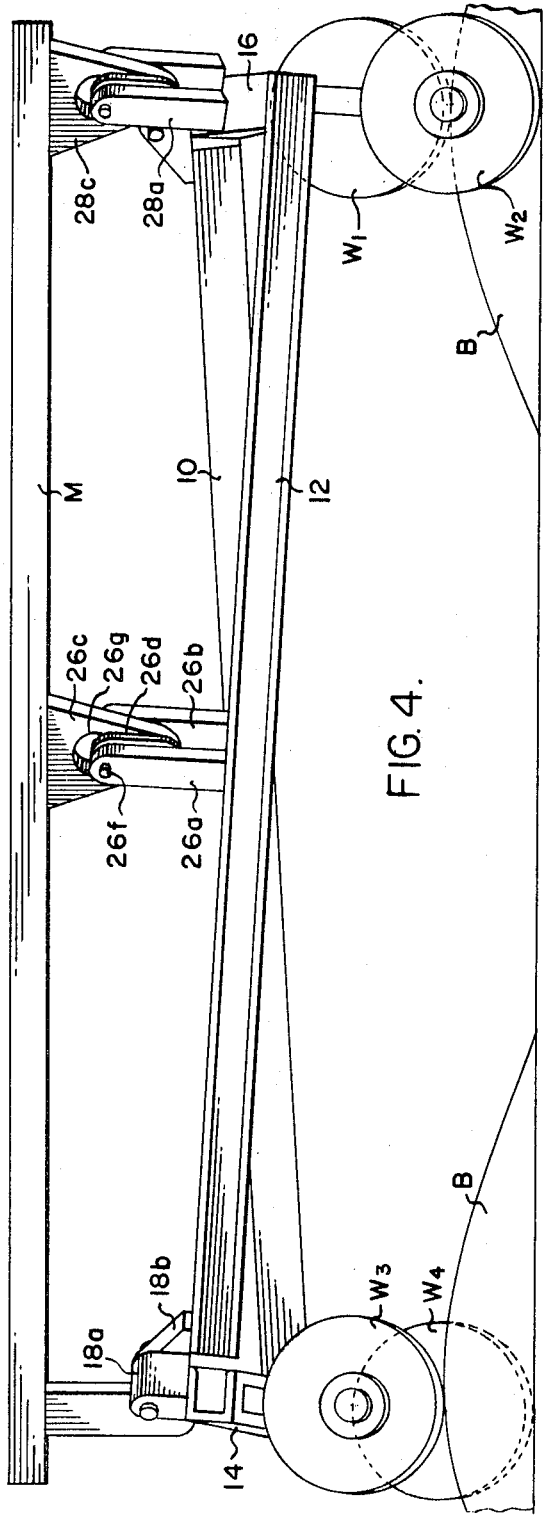

INVENTOR
RONALD D. MOORE

BY

*Learman, Learman & McCulloch*

ARTICULATED VEHICLE SUSPENSION SYSTEM

This invention relates to suspension systems, and more particularly to an articulated suspension system for a vehicle.

It is an object of the present invention to provide a suspension system which will limit the torque transmitted to the load carried by the vehicle.

Another object of the present invention is to provide a suspension system for use in a vehicle which is deployed in irregular terrain and which will distribute the load or shock, resulting from the vehicle traversing uneven terrain, among all four wheels.

Still another object of the present invention is to provide a vehicle suspension system which will reduce the angle of tilt of the load mounted on a vehicle as the vehicle traverses uneven terrain.

Yet another object of the present invention is to provide a suspension system which will reduce the power required to move a vehicle over rough terrain and improve the traction of the vehicle.

A further object of the present invention is to provide a suspension system which will provide a soft ride for sensitive equipment.

A still further object of the present invention is to provide a suspension system which will enable opposite transverse ends of the suspension system to rotate in opposite directions about the longitudinal axes of the suspension system and enable opposite longitudinal sides of the vehicle suspension system to pivot in opposite directions about a transverse axis of the suspension system.

Briefly, according to the present invention, there is provided an articulated suspension for attachment to a load bearing frame, including an articulated frame having two articulately connected portions. The two portions are adapted to be pivotally connected to the load bearing frame to move generally vertically relative to the load bearing frame about two parallel, spaced-apart axes. The two portions are articulately connected to each other by hinge means located along a third axis which extends diagonally of the articulated frame and is parallel to the first and second axes. Preferably, one of the articulately connected portions is mounted for movement about a set of fixed pivots located on one axis and the other portion is mounted for movement about pivots located generally on the other axis.

Other objects and advantages of the present invention will be specifically pointed out or will become apparent to those of ordinary skill in the art from the following description when it is considered in conjunction with the appended claims and the accompanying drawings, in which:

FIG. 1 is a perspective view of the articulated frame and pivot mountings therefor;

FIG. 2 is a top plan view of the articulated suspension system, taken along line 2-2 of FIG. 3;

FIG. 3 is a side elevational view illustrating the position of the parts when the vehicle traverses level terrain;

FIG. 4 is a side elevational view similar to FIG. 3, illustrating the relative position of the parts when diagonally opposite wheels negotiate an obstacle;

Figure 5:
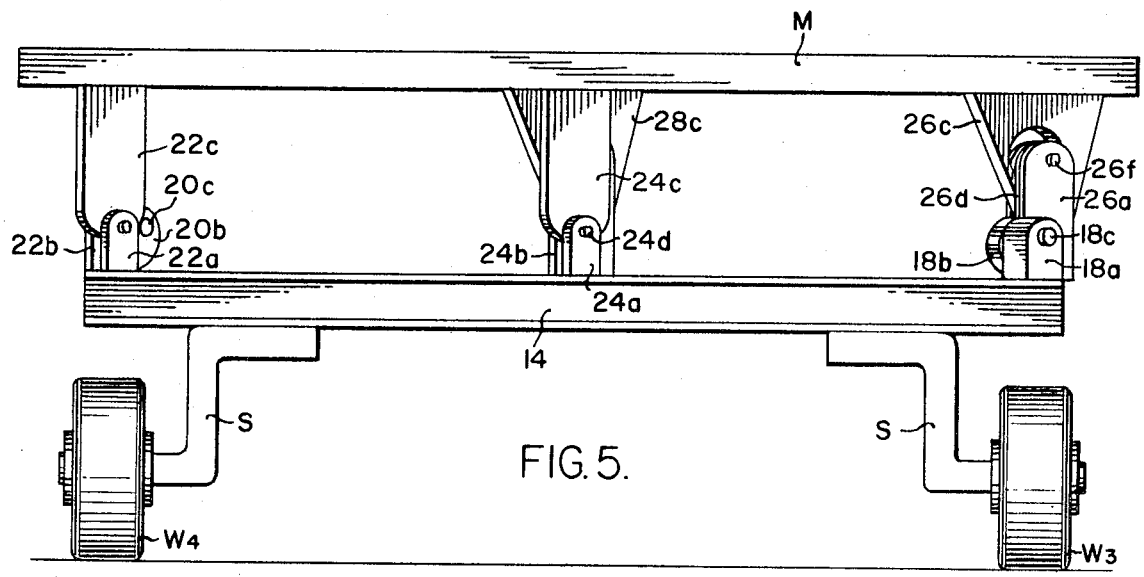
FIG. 5 is a front elevational view of the vehicle shown in FIG. 3.

Apparatus constructed according to the invention comprises the articulating frame generally designated F which includes longitudinally extending members 10 and 12, and a pair of transversely extending members 14 and 16. Longitudinally extending member 10 and transversely extending member 14 are rigidly connected together at 13 to form a unitary half-frame portion designated generally P. Similarly, longitudinally extending member 12 and transversely extending member 16 are rigidly connected together at the diagonally opposite corner 15 to form a second unitary half-portion which will generally be designated U. As can thus be seen in FIGS. 1 and 2, sides 10 and 14 and sides 12 and 16 each form two sides of two imaginary coincident triangles having a common hypotenuse 17. The half-frame portions U and P are pivotally connected by a pair of angularly disposed hinges 18 and 20, which both pivot about the diagonal axis 17.

The articulating frame F is supported on four conventional wheels W by means of wheel support members S which depend from the bottom of frame F in a manner which will be described more fully hereinafter. The main vehicle or load bearing frame M (shown in phantom lines in FIG. 1) is pivotally mounted atop the suspension frame F in a manner also to be described more fully hereinafter.

The hinge member 18 includes leg portions 18a and 18b rigidly connected with members 14 and 12, respectively, and having passages therein adapted to receive pivot pin 18c, which lies along the articulating frame axis 17. Hinge member 20 is similarly formed and the corresponding portions thereof are indicated by the numeral 20 followed by the same letter subscripts. Small spaces 19 and 19' exist between the ends of members 10 and 12 and 14 and 16 respectively to permit relative movement of the half-frame sections P and U.

Figure 8:
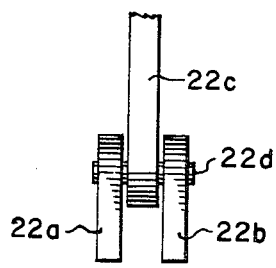
FIG. 8 is an exploded view of the fixed pivot, taken along the line 8-8 of FIG. 2.

The first half-frame portion P is pivotally connected with the load bearing frame M by a pair of fixed pivot assemblies 22 and 24 which are connected with the midpoints of longitudinal frame members 10 and 14, respectively, in a manner to be described more fully hereinafter. Pivot assembly 22 may conveniently include a pair of side plates 22a and 22b (FIG. 8) connected with member 10 in any suitable manner, such as by welding. Disposed between the spaced apart plates 22a and 22b is a mounting bracket 22c pivotally supported on pin 22d which is secured between the plates 22a and 22b in any suitable manner. Member 22c is connected with the main frame M by any suitable means such as welding. As can be best seen in FIG. 2, the pivot pin 22d lies along another axis or centerline 17a. Pivot assembly 24 is similarly formed and the corresponding portions thereof are indicated by the numeral 24 followed by corresponding subscripts. It may be seen that the pivot pins 24d and 22d both lie along the same axis 17a and hence the half-portion P may pivot about pins 22d and 24d relative to the main frame M. As shown in the drawings, axes 17 and 17a are parallel and in laterally spaced relation with each other.

Figure 6:
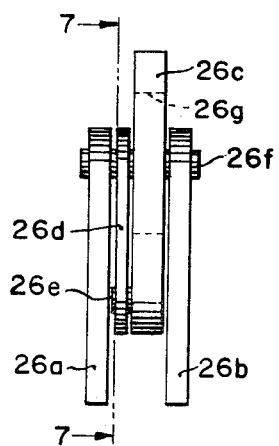
FIG. 6 is an exploded view illustrating the movable pivot, taken along the line 6-6 of FIG. 2.
Figure 7:
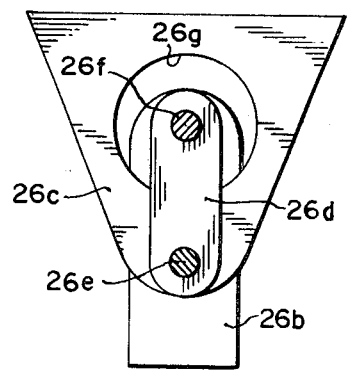
FIG. 7 is a sectional view of the movable pivot taken along the line 7-7 of FIG. 6.

The second half-portion U is pivotally connected with main frame M by a pair of movable pivot assemblies 26 and 28 which are connected with members 12 and 16, respectively, in a manner to be presently described. The movable assembly 26 includes a pair of spaced-apart plates 26a and 26b connected with member 12 in any suitable manner, such as welding, and a plate member 26c depending from main support member M and connected thereto in any suitable manner, such as welding. A shackle link 26d (FIGS. 6 and 7) is connected with the lower portion of plate 26c by means of a pin 26e and with spaced-apart plates 26a and 26b by an upper pin 26f extending through the enlarged aperture 26g formed in plate member 26c. As shown in FIG. 7, aperture 26g is relatively large compared to the diameter of pin 26f, which constitutes the pivot pin of the shackle linkage and lies along still another axis 17b. The aperture 26g permits the pin 26f in the upper portion of link 26d to move toward the fixed pivot member 24 when the vehicle negotiates an obstruction, thereby permitting member 12 to move in a direction laterally closer to longitudinal member 10, the freedom of movement thus minimizing the stresses in the frames the lateral distance between axes 17a and 17b is similarly diminished by this movement. Pivot member 28 is formed similarly to movable pivot 26 and corresponding parts are indicated by the numeral 28 with corresponding subscripts. As can best be seen in FIG. 2, the pivot pins 28f and 26f both lie generally along the axis 17b which is parallel to axes 17 and 17a, thereby permitting frame half-portion U to pivot relative to the main frame F, as well as the other half *ortion Pz*

As best shown in FIG. 2, the sides of the fixed pivot members 22 and 24, the movable pivot members 26 and 28, and the articulating frame hinge members 18 and 20 all extend at an angle relative to the longitudinal and transverse members 10, 12, 14 and 16. The pivot members are all located at the midpoints of the respective sides of an imaginary rectangle shown in dotted lines at 30. The center line 17 passes through diagonally opposite corners of rectangle 30. It should be noted that the articulating frame hinge members 18 and 20 need not necessarily be formed as shown in the drawing, but could be many different forms. For example, the adjacent end portions of members 10, 16, 14 and 12 could be each shortened from the position shown in FIG. 2, and the device would still operate as shown so long as the pivot pins 20c and 18c still lay along center line 17.

As shown in FIG. 5, brackets S depend from the bottom of the frame F to support wheels $W_1$, $W_2$, $W_3$ and $W_4$. The wheels $W_1$ and $W_3$ are so located that the lines of contact of the wheels $W_1$ and $W_3$ with the surface being traversed at any one time preferably lie along the center line 17.

In operation, assuming that the front and rear diagonally opposite wheels $W_1$ and $W_3$ negotiate a pair of bumps or other irregular surfaces B, as shown in FIG. 4, they will be elevated from the position shown in FIG. 3 to that shown in FIG. 4. The resulting action can be best understood by reference to certain fundamental geometrical relationships, particularly those concerning triangles. As can be seen in FIG. 2, when the hinge portions 18 and 20 are raised upwardly, half-frame portions U and P will be thus caused to pivot relative to each other about axis 17. Simultaneously, half-frame portion U is rotating clockwisely about axis 17b while half-frame portion P is rotating counterclockwisely about axis 17a as indicated by the arrows 35 and 36 (FIG. 1) respectively. At the same time, because of the enlarged apertures formed in movable shackle linkages 26 and 28, the pivot pins 26f and 28f will be permitted to move toward pivot members 22 and 24 so that the distance between the axes 17a and 17b is diminished. This minimizes the torsional stresses which would normally be set up in a frame subjected to bending and twisting forces of the type described. This operation further results in more even loading to the respective wheels W. Finally, as shown in FIG. 4, the main frame M remains more level, thereby protecting the load carried thereby.

If the other diagonally opposite wheels W encounter bumps B, similar flexing will occur except that portion P will rotate clockwisely about axis 17a while portion U rotates counterclockwisely about axis 17b.

The invention is defined in the claims.

I claim:

1. An articulated suspension system adapted for use with the load bearing frame of a vehicle comprising:
   an articulated frame including two halves each adapted for pivotal connection with said load bearing frame, each of said halves comprising a longitudinal portion and a transverse portion, said longitudinal and transverse portions of one half being pivotally connected with the transverse and longitudinal portions, respectively, of the second half by a pair of hinge members both pivoting generally about a common axis;
   and ground support members connected with said articulated frame.

2. An articulated suspension system as set forth in claim 1 wherein said longitudinal and transverse portions of each half are rigidly connected.

3. An articulated suspension system adapted for use with the load bearing frame of a vehicle comprising:
   an articulated frame including first and second half-frame portions, each including a longitudinal portion and a transverse portion;
   said first half-frame portion including first pivot means pivotal generally about a first axis and connected with said load bearing
   said second half-frame portion including second pivot means pivotal generally about a second axis generally parallel to and in spaced relation with said first axis and connected with said load bearing frame;
   said first and second halves being pivotally connected by third pivot means pivotal generally about a third axis generally parallel to said first and second axes;
   and ground support members for said articulated frame.

4. An articulated suspension system as set forth in claim 3 wherein said first pivot means comprises means pivoting about a fixed pivot and said second pivot means comprises means pivoting about a movable pivot.

5. An articulated suspension system as set forth in claim 4 wherein said first pivot means comprises first and second pivot members pivotally mounted for movememt about said first axis and fixed to the midpoints of said longitudinal and transverse portions, respectively, of said first half; said second pivot means comprises third and fourth pivot members pivotally mounted to move generally about said second axis.

6. An articulated suspension system as set forth in claim 3 wherein said longitudinal and transverse portions of each half are rigidly connected; and said third pivot means comprises fifth and sixth pivot members pivotally connecting the longitudinal and transverse portions of said first half-frame portion to the transverse and longitudinal portions of said second half-frame portion respectively.

7. An articulated suspension system as set forth in claim 3 wherein said first, second and third axes extend angularly to both said longitudinal and transverse members.

8. An articulated vehicle suspension for attachment to a load supporting frame comprising:
   an articulated frame including articulately connected first and second pivotally connected portions;
   first means for pivotally mounting said first portion on said load bearing frame for movement about a first axis;
   second means for pivotably mounting said second portion on said load bearing frame for movement generally about a second axis which is generally parallel to and in spaced relation with said first axis;
   and wheels for supporting said vehicle suspension.

9. An articulated suspension system as set forth in claim 8 wherein said first and second portions include:
   first and second articulately connected halves;
   said first means including first and second spaced-apart pivot means pivotally mounted for movement generally about a fixed pivot located on said first axis for pivoting said first half of said articulating frame relative to said load bearing frame;
   said second means including third and fourth spaced-apart pivot means pivotably mounted for movement generally about a movable pivot located on said second axis for pivoting said second half of said articulating frame relative to said load bearing frame;
   said third and fourth pivot means swinging toward and away from said first and second pivot members when said first and second halves are moved relative to each other.

10. An articulated suspension system as set forth in claim 9 wherein each of said third and fourth movable pivot means comprises a shackle linkage including a first bracket having an enlarged aperture therein and adapted to depend from said load bearing frame, a second bracket on the articulating frame; a pin on the second bracket passing freely through said aperture and movable laterally therein; and a link having one end connected with said first bracket and the other end attached to said pin.

11. A vehicle comprising:
   a rectangular articulating frame having four corners and including a pair of longitudinally extending members and a pair of transversely extending members;
   said longitudinally and transversely extending members being rigidly connected at the corners of said frame along a first diagonal and pivotally connected at the corners along a second diagonal of said rectangular frame;
   a load bearing frame;

means for pivotally connecting the midpoints of said longitudinally and transversely extending members with said load bearing frame;

and support members at each of the four corners of said articulating frame for supporting said vehicle on the surface over which it is to travel.

12. A vehicle as set forth in claim 11 wherein said means for pivotally connecting the midpoints includes means pivoting about an axis extending angularly to both said longitudinally and transversely extending members.

13. A vehicle as set forth in claim 11 wherein said means for pivotally connecting the midpoints includes first pivot means pivoting about a first fixed axis and second pivot means pivoting generally about a second movable axis.

14. A vehicle as set forth in claim 11 wherein said means for pivotally connecting the midpoints includes first and second pivot means movable about first and second apaced apart axes, said first and second axes extending parallel to and in spaced relation with said second diagonal.

15. An articulated suspension system for use with a load bearing vehicle frame comprising:

a rectangular frame including first and second complementary frame portions;

means for connecting said first and second portions to said load bearing frame;

means pivotally connecting said first and second frame portions about a transverse axis coinciding with a diagonal of said rectangular frame;

and means for supporting said rectangular frame for movement along a surface.

16. An articulated suspension as set forth in claim 15 wherein said means connecting said first and second portions with said vehicle frame permits limited generally transverse movement of one of said longitudinal members and limited generally longitudinal movement of one said transverse members while maintaining said longitudinal members and transverse members in respective parallel relation.